United States Patent [19]

Case

[11] 3,946,910

[45] Mar. 30, 1976

[54] DRY TONER DISPENSER ASSEMBLY FOR COPYING MACHINE

[75] Inventor: Brian J. Case, Fountain Valley, Calif.

[73] Assignee: A. B. Dick Company, Chicago, Ill.

[22] Filed: Jan. 13, 1975

[21] Appl. No.: 540,350

[52] U.S. Cl. ............ 222/238; 222/414; 222/DIG. 1

[51] Int. Cl.[2] ........................................... B65G 65/48

[58] Field of Search ............... 222/414, DIG. 1, 238; 74/112

[56] References Cited

UNITED STATES PATENTS

| | | | |
|---|---|---|---|
| 2,872,080 | 2/1959 | Thene | 222/238 X |
| 3,367,307 | 2/1968 | Lawes et al. | 222/DIG. 1 |
| 3,534,787 | 10/1970 | Heck | 222/414 X |
| 3,656,509 | 4/1972 | Yasu | 222/DIG. 1 |
| 3,869,929 | 3/1975 | Tosi | 74/112 |

*Primary Examiner*—Robert B. Reeves
*Assistant Examiner*—John P. Shannon
*Attorney, Agent, or Firm*—Ronald J. LaPorte; Peter S. Lucyshyn

[57] ABSTRACT

A dry toner dispenser for use in an electrostatic or the like copying machine includes a hopper having a bottom opening from which dry toner particles are dispensed. A roll having a plurality of resilient fibers extending generally radially outwardly therefrom is mounted for rotation in the opening. A dispenser bar mounted outside of the hopper engages the resilient fibers of the roll. As the roll turns, the bar momentarily holds the fibers against the direction of rotation and then releases the fibers in a spring action to cause toner particles held between the fibers to be projected therefrom into the developer apparatus of the copying machine. A wheel rotatable in accordance with the operation of the copying machine drives a pivotal member which in turn rotates the dispenser roll incrementally. A manually positionable cam limits the movement of the pivotal member. An agitator included in the hopper is coupled to the drive roll for rotation therewith and maintains the toner particles in a loose condition.

11 Claims, 4 Drawing Figures

DRY TONER DISPENSER ASSEMBLY FOR COPYING MACHINE

BACKGROUND OF THE INVENTION

This invention relates to dry toner dispensing apparatus for use in electrostatic and the like copying machines.

Toner dispensers which are employed in electrostatic type copying machines are provided to supply toner automatically, to the developer mixture of carrier and toner provided in the copying machine developer apparatus. The addition of toner from the dispenser must be such that the ratio of carrier and toner is properly maintained to ensure that ample toner will be applied from the developer apparatus to the latent image on a photoconductive member being developed, regardless of copy demand. This in fact is not an easy task since the amount of toner particles in a developer mixture is sometimes as small as one or two percent. Furthermore, the toner particles are extremely small in size and have a low specific gravity. Also the toner particles are sensitive to heat, pressure, friction and moisture which can cause packing and fusing of the particles prior to dispensing.

Many types of dry toner dispensers are available for use with developer apparatus in copying machines, but few appear to be capable of providing sufficient variation in the quantity of toner dispensed to accommodate varying copy demands. One prior art toner dispenser includes a hopper having an opening at the bottom for feeding toner particles into a developer apparatus. The dispensing of the toner particles is accomplished by using a metering device, such as a roller, mounted in the opening and arranged to be rotated to permit toner to be dispensed by gravity into the developer apparatus. The last-mentioned toner dispenser, while being suited for some copy demands, is not sufficiently regulatable to dispense precise amounts of toner into the developer apparatus for varying copy demands.

SUMMARY OF THE INVENTION

Accordingly, it is a primary object of the present invention to provide a new and improved dry toner dispenser which overcomes the drawbacks of prior art dry toner dispensers.

It is another object of the invention to provide a new and improved dry toner dispenser which is regulatable to dispense precise quantities of toner to a developer apparatus of a copying machine to accommodate varying copy demands.

It is another object of the present invention to provide a dry toner dispenser of the last-mentioned type which operates automatically to dispense pre-selected quantities of toner in accordance with the copy demand of a copying machine in which the dispenser is employed.

It is yet another object of the present invention to provide a new and improved dry toner dispenser of the above-described type which is relatively simple in construction, yet efficient in operation.

Briefly, a preferred embodiment of a dry toner dispenser according to the invention includes a hopper tapered toward a bottom opening. Mounted in the opening between a pair of end walls of the hopper is a dispenser roll. A plurality of resilient fibers extend substantially radially outwardly from the surface of the roll. The lower surface of the roll extends outwardly of the hopper.

The roll fibers are spaced just slightly from the front and rear walls of the hopper to prevent toner from falling from the bottom opening thereof. Toner is metered by the edge of one of the walls and it is carried out of the hopper on the roll surface between the fibers. The end of a dispenser bar extending the length of the roll engages the fibers of the roll along the lower half thereof. The bar causes the fibers to be momentarily held against the direction of rotation of the roll and then released so that a springing action occurs. This action causes toner particles trapped between the fibers to be projected therefrom into the bin of a developer apparatus of the copying machine.

The roll is driven incrementally during the time that copies are in the machine. The arc through which the roll turns in regulatable by means of a cam controlled assembly which decreases or increases the rotation of the dispenser roll depending upon the setting of the cam. A wheel rotatable in accordance with the operation of the copying machine drives a pivotal member through a one-way clutch which in turn drives the dispenser roll. The pivotal movement of the member is regulated by the pre-selected position of the cam.

An agitator also included in the hopper is coupled through a suitable gear arrangement to the dispenser roll for rotation in the opposite direction therefrom. The agitator comprises a rotatable rod extending between the end walls of the hopper in substantially parallel alignment with the dispenser roll. The rod includes a plurality of pins extending therefrom. The rotation of the rod drives the pins through the toner particles in the hopper to maintain the toner in a loose condition. The latter avoids sticking, bridging and clumping of the toner particles in the hopper and assures proper dispenser roll filling or toner pickup.

DETAILED DESCRIPTION OF THE DRAWING

Figure 1:
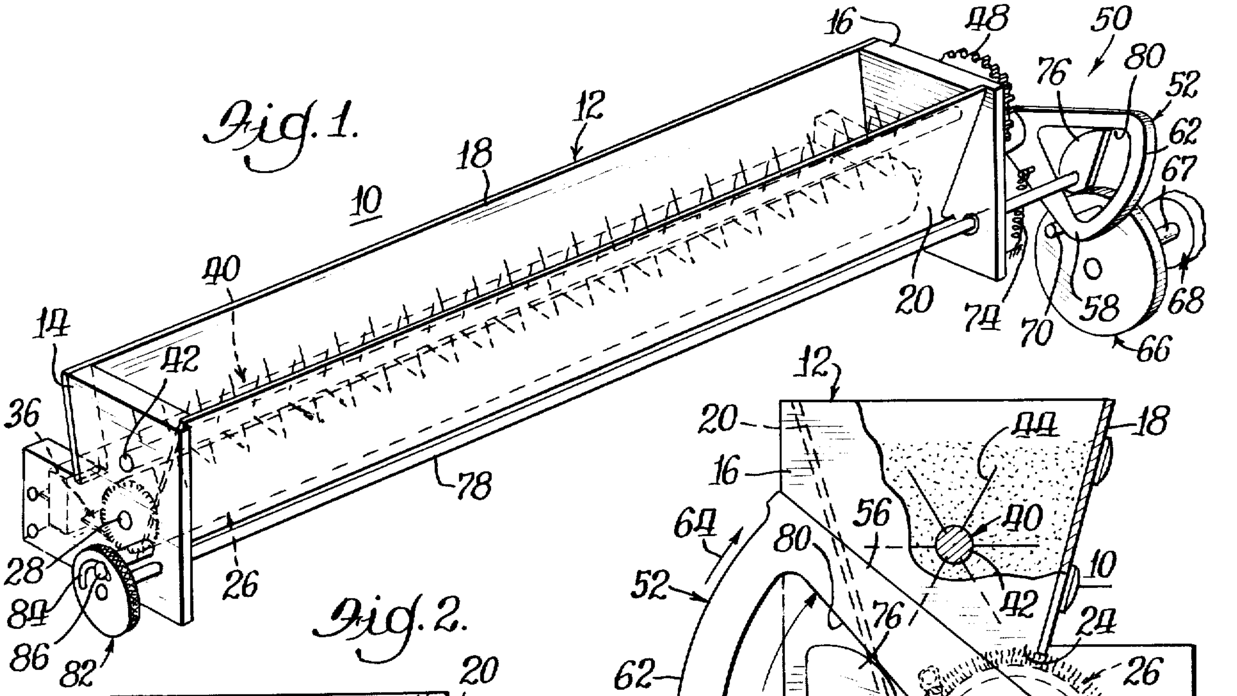
FIG. 1 is a perspective view of a dry toner dispenser assembly according to the invention.
Figure 2:
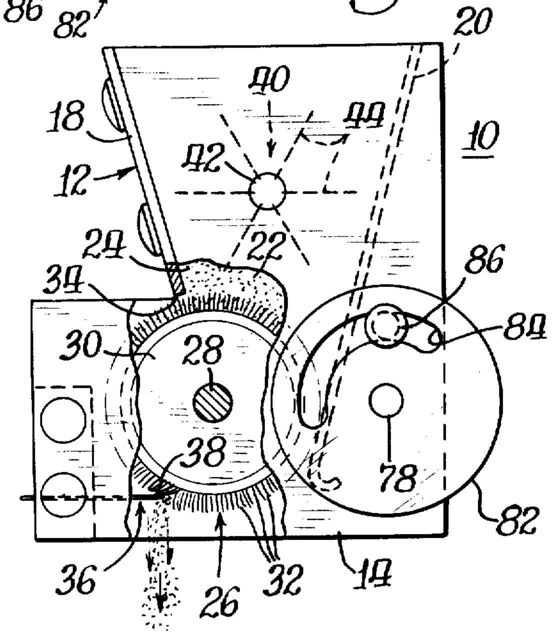
FIGS. 2 and 3 are opposite end views of the dry toner dispenser assembly of FIG. 1.
Figure 3:
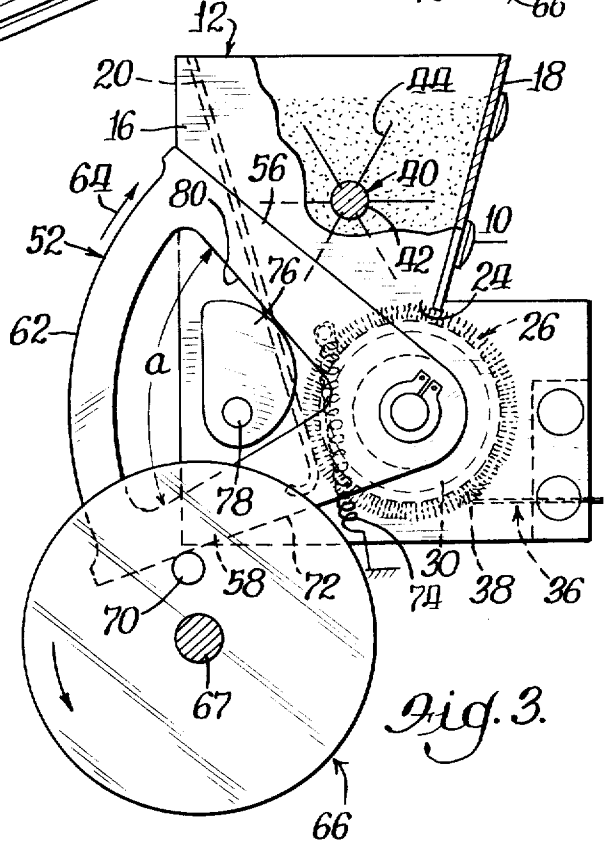

Referring now to the drawing in greater detail wherein like numerals are employed to designate similar components throughout the various views, a dry toner dispenser assembly 10 according to the invention includes a hopper or container, designated by the numeral 12. The hopper 12 has a pair of end walls 14, 16 and front and rear walls 18, 20, respectively, joined at opposite ends thereof to the end walls. The front and rear walls are angled toward each other at the lower end or bottom of the hopper to ensure the movement by gravity of toner particles 22 (FIG. 3) provided in the hopper toward a bottom opening 24 extending the length of the hopper and defined by walls 18, 20. A dispenser roll 26 is mounted in and closes off the bottom opening 24 of the hopper. The roll is supported on a shaft 28 between end walls 14, 16, in suitable bearings, such as 17 (See FIG. 4). The dispenser roll includes a central core 30 mounted on shaft 28 and covered with a material having a plurality of fibers, such as 32, extending therefrom. A typical material is one having a solvent activated adhesive backing layer with a nylon fiber facing. The fibers are oriented preferrably perpendicular to the backing layer so that they extend substantially radially outwardly of the roll 26 when the core is covered thereby. The fibers are resilient and as such when bent and released, spring back to their original position. Such a material is sold by the 3M Corporation under the trademark Fibre-Tran.

The front wall 20 of the hopper is longer than the rear wall 18 thereof. Wall 20 extends along a plane tangent to the periphery of roll 26 and prevents toner particles from leaking out of the bottom opening of hopper 12. The rear wall 18 of the hopper is shorter than wall 20 and extends along a plane generally radially toward the periphery of the roll 26. The edge 34 of the wall 18, as will be explained in greater detail hereinafter, meters toner to the roll 26. The toner is then carried out of the hopper on the roll surface between the fibers 32.

Outside of the hopper between end walls 14, 16, there is mounted a dispenser or flicker bar 36. The bar is positioned so that a free end 38 thereof engages the fibers 32 as the dispenser roll 26 is rotated. The engagement and release of the fibers causes toner particles held between the fibers on the roll surface to be projected therefrom into a developer apparatus (not shown).

Figure 4:
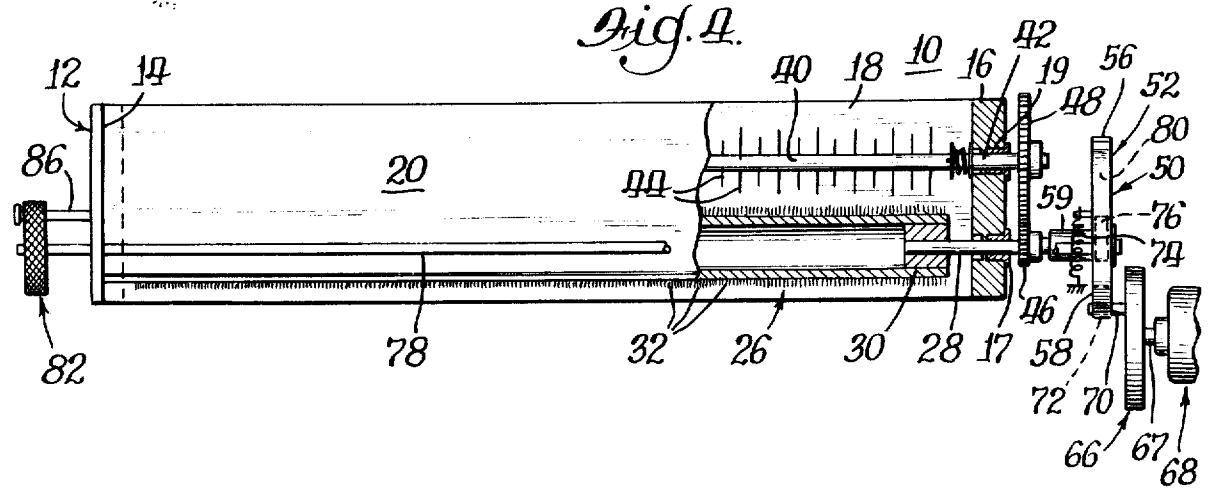
FIG. 4 is a side view of the dry toner dispenser assembly of FIG. 1.

A toner agitator 40 is also provided in hopper 12. The agitator 40 includes a rod 42 mounted for rotation between end walls 14, 16, in suitable bearing supports such as 19 (FIG. 4). A plurality of pin-like members 44 extend outwardly from the rod 42, transversely thereof. As the rod is rotated, the pin members 44 move through the hopper stirring the toner particles 22 to prevent clumping or caking thereof in the hopper. This maintains the particles separated for proper and uniform dispensing. The central shaft of roll 26 and the agitator rod 42 are coupled together through gears 46, 48, mounted at the first ends, respectively, thereof. Thus, rotation of dispenser roll 26 causes agitator 40 to be rotated in the opposite direction therefrom.

A drive arrangement 50 is included in the toner dispenser assembly for rotating dispenser roll 26 incrementally for dispensing toner particles from the dispenser assembly. The drive arrangement 50 includes a one piece drive member 52 connected at an end 54 thereof through a one-way clutch mechanism 59 (See FIG. 4) to the shaft 28 of dispenser roll 26. A pair of arms 56, 58, extend outwardly from end 54 of the drive member at an angle *a* (See FIG. 3) with respect to each other. The free ends of the arms are joined by an arcuate shaped support member 62. Pivotal movement of the drive member in the direction of arrow 64 (FIG. 3) drives the dispenser roll 26 rotatably in a like direction through the clutch mechanism 59. Pivotal movement of the drive member in the opposite direction causes no movement of the roll 26 due to the decoupling of the drive member and roll 26 by the one-way clutch mechanism.

A drive wheel 66 is provided to impart pivotal movement to the drive member 52. The wheel is coupled to the drive shaft 67 of a motor 68 actuable in accordance with the operation of the copying machine (not shown) in which the toner dispenser assembly is employed during the copy making process. The wheel includes a pin member 70 extending outwardly from one surface thereof along a line substantially parallel to the axis of rotation of the motor drive shaft 67. As the wheel is rotated by motor 68, pin member 70 revolves about the shaft 67 and periodically moves into engagement with the edge 72 of arm 58 of the drive member causing the latter to be pivoted about shaft 28 in the direction of arrow 64. The pivotal movement of the drive member through one-way clutch 59 drives roll 26 incrementally. As the pin member 70 passes arm 58, the drive member is returned to its original position through the action of return spring 74.

To limit the travel of the drive member 52 and thereby to selectively regulate or control the degree of incremental rotation of dispenser roll 26, there is provided a stop or cam 76. The cam is mounted on a rod 78 passing through and between end walls 14, 16. The rod extends beyond end wall 16 where cam 76 is mounted at the end of the rod between the arms 56, 58 of the drive member 52. Thus, as the drive member is returned to its home position after having been driven pivotally in the direction of arrow 64 by wheel 66, the cam member engages edge 80 of arm 56, limiting the movement of the drive member in the direction opposite from arrow 64. In this manner, the arm 58 is positioned more closely to or further from pin member 70 as the latter is moved about for engagement therewith. As such, the pivotal movement of the drive member as a result of engagement by pin member 70 with arm 54, is controlled or regulated accordingly.

The cam or stop 76 can be rotated into a varying number of positions to increase or decrease the pivotal movement of the drive member 52 and the incremental rotation of dispenser roll 26 to accommodate varying copying demands. The latter is accomplished by rotating manually the thumb wheel 82 connected to the opposite end of rod 78. This function could also be carried out automatically by means of a motor (not shown) operated in accordance with the sensing of the density of an original document being copied. The thumb wheel includes an arcuate slot 84 formed therein and a pin 86 which is received in the slot. The latter limits the rotatable movement of thumb wheel 82 and as such the movement of cam 76 between two extreme positions, one of which as shown in the figures, provides a minimum incremental rotation of dispenser roll 26 and the other of which permits a maximum incremental rotation of the roll. Settings in between the last-mentioned provide differing degrees of rotation of the roll and as such corresponding degrees of toner particle dispensing from hopper 12 of the assembly.

In operation, upon energization of drive motor 68, which is normally operated during the time copies are being made in a copying machine in which the dispenser assembly is employed, shaft 67 of the drive motor is rotated. The rotation of the last-mentioned shaft turns wheel 66 causing pin member 70 to be revolved into engagement with edge 72 of the arm 58 of drive member 52. Engagement of the arm 58 by the pin member moves drive member 52 pivotally about end 54 in the direction of arrow 64 (See FIG. 3). The pivotal movement of drive member 52 in the last-mentioned direction imparts incremental rotational movement in a like direction, through one-way clutch mechanism 59, to dispenser roll 26.

Rotation of the dispenser roll causes some of the fibers 32 extending from the surface thereof to be driven past the dispenser or flicker bar 36. The end 38 of the dispenser bar momentarily holds the fibers against the direction of rotation of roll 26 and thereafter, as the roll continues to be rotated, releases the fibers. Because of the resiliency of the fibers, they spring back to their normal position, projecting toner particles held between the fibers outwardly therefrom toward a copying machine developer apparatus (not shown).

To reach the dispenser bar 36 for projection in the developer apparatus, the toner particles 22 must be accumulated between the fibers 32 of the roll 26 as the fibers pass through the hopper 12. At this time, gravity causes the toner particles to be carried toward the roll 26. The movement of the roll through the toner particles picks up the latter between the fibers 32 on the surface of the roll. As the roll surface passes edge 34 of rear wall 18 of the hopper, toner is metered thereby to the roll surface. The toner remaining held in the fibers 32 at wall edge 34 is carried by the roll 26 toward dispenser bar 36. Once arriving thereat, as explained heretofore, the toner is projected from roll 26 into the developer apparatus (not shown) mounted below.

The incremental movement of roll 26 as described, is regulatable by means of cam 76. The cam which engages edge 80 of arm 56 of the dispenser member 52, limits the pivotal return movement thereof (in the direction opposite from arm 64). In this manner, arm 58 is positioned nearer to or further from the pin member 70 of wheel 66. Thus, the engagement of the edge 72 of arm member 58 by the pin member is controlled and as such the arc through which the drive member 52 travels when driven by the pin member 70 is regulated accordingly. The cam member 76 can be moved, as described, to a varying number of positions by the action of thumb wheel 82. The latter changes the rotational travel of roll 26 in the direction of arrow 64 and the corresponding quantity of toner dispensed by the dispenser assembly 10.

As described above, the toner agitator 40 is coupled through gears 46, 48 to the roll 26 and as such is driven therewith by drive member 52. The agitator maintains the toner particles in a loosely held condition to ensure that the particles fall properly between fibers 32 on roll 26 to be carried thereby to dispenser bar 36 for projection by the action of the dispenser bar against the fibers.

The toner dispenser assembly according to the invention is a relatively simple, yet effective apparatus for providing controlled, precise quantities of toner to a developer apparatus of a copying machine thereby to maintain the ratio of toner and carrier in the developer apparatus at a proper level. This in turn provides adequately developed copies produced by the machine. Furthermore, the toner dispenser assembly can be regulated easily to alter the quantities of toner particles dispensed for varying copy demands.

While a particular embodiment of the invention has been shown and described, it should be understood that the invention is not limited thereto since many modifications may be made. It is therefore contemplated to cover by the present application any and all such modifications as fall within the true spirit and scope of the appended claims.

What I claim is:

1. A dry toner dispenser assembly for use in dispensing quantities of dry toner particles to the developer apparatus of a copying machine, said dispenser assembly including in combination:

hopper means for receiving a quantity of toner particles, said hopper means defining an opening in the bottom thereof from which said toner particles are dispensed, a dispenser roll being mounted for rotation in the bottom opening of said hopper means for carrying toner particles deposited on the surface thereof through said opening, into the developer apparatus, dispenser roll drive means, said drive means including a drive member coupled to said roll for rotating said roll in accordance with movement of said drive member in a first direction, means for moving said drive member in said first direction and means for selectively regulating the movement of said drive member in said first direction whereby said roll is rotatably driven incrementally in accordance with the movement of said drive member and further including one-way clutch means coupling said drive member and said dispenser roll, said clutch means translating the movement of said drive member in said first direction into rotation of said roll, said clutch means decoupling said drive member and dispenser roll upon said drive member being moved in the opposite direction, wherein said means for moving said drive member in said first direction includes rotatable wheel means having a member extending outwardly therefrom, said member engaging said drive member as said wheel means is rotated to move said drive member in said first direction and wherein said regulating means includes an adjustable stop means positioned for engagement with said drive member to limit the movement thereof, whereby the rotation of said dispenser roll is limited accordingly.

2. A dry toner dispenser assembly as claimed in claim 1 wherein said dispenser roll includes a plurality of resilient fibers extending generally outwardly therefrom about the periphery thereof for accumulating toner particles therebetween and flicker means mounted outside of said hopper means adjacent said dispenser roll, said flicker means engaging the resilient fibers extending from said roll as the latter is rotated to momentarily hold said fibers engaged thereby against the direction of rotation of said roll and thereafter as said roll is rotated, releasing said fibers in a springing action to project particles of toner held between said fibers into the developer apparatus of said copying machine.

3. A toner dispenser assembly as claimed in claim 2 wherein said flicker means includes an elongated bar member mounted for engagement with said resilient fibers along the length of said roll.

4. A toner dispenser assembly as claimed in claim 2 further including toner particle agitation means mounted in said hopper means adjacent said dispenser roll, said toner particle agitation means being operable in accordance with the rotation of said dispenser roll for maintaining said toner particles in a loosely held condition in said hopper.

5. A dry toner dispenser assembly as claimed in claim 4 wherein said toner particle agitation means includes rod means mounted for rotation in said hopper means in subsstantially parallel alignment with said roll, said rod means including a plurality of pin means extending generally radially outwardly of said rod means about the periphery thereof, said rod means being coupled to said roll and being rotatable in accordance with the rotation thereof.

6. A dry toner dispenser assembly as claimed in claim 1 wherein said drive member is mounted at a first end thereof through said one-way clutch means to said dispenser roll for pivotal movement in said first and opposite directions, respectively, wherein said drive member includes a pair of arms extending from said first end thereof forming an angle therebetween, and wherein said adjustable stop means includes a cam member mounted between the free ends of said arms for engagement with a first one thereof, said cam member limiting the movement of said arm pair in said opposite direction, the other one of said arms being engaged by the pin member of said wheel means to move the arm pair pivotally about the first ends thereof in said first direction for driving said dispenser roll, the position of said cam member being adjustable to control the pivotal movement of said arm pair for regulating the rotational movement of said dispenser roll.

7. In a copying machine in which a copy of an original document is made including developer apparatus for applying toner particles to provide a visible image of said original document, a dry toner dispenser assembly for supplying quantities of dry toner particles to said developer apparatus, said toner dispenser assembly including in combination:

hopper means for receiving a quantity of toner particles, said hopper means including front, rear and adjoining end walls defining an opening at the bottom of said hopper through which said toner particles are dispensed, a dispenser roll mounted for rotation in the bottom opening of said hopper means for carrying toner particles received on the outer surface thereof outwardly of said hopper means through said opening, dispenser roll drive means including a drive member mounted for pivotal movement at a first end thereof to said dispenser roll, one-way clutch means interposed between said first end of said drive member and said roll whereby pivotal movement of said drive member in a first direction imparts rotation to said dispenser roll in a predetermined direction, said roll remaining stationary when said drive member is pivoted in the opposite direction and means for engaging said drive member to to pivot the latter in said first direction for driving said dispenser roll accordingly, wherein said means for engaging said drive member for pivoting the latter in said first direction includes rotatable wheel means having a member extending outwardly therefrom, said member engaging said drive member periodically upon rotation of said wheel means to pivot said drive member in said first direction for driving said dispenser roll.

8. A toner dispenser assembly as claimed in claim 7 wherein said dispenser roll includes a plurality of resilient fibers extending generally outwardly therefrom about the periphery of said roll for accumulating toner particles therebetween said dispenser control means mounted outside of said hopper means adjacent said dispenser roll, said dispenser control means engaging the resilient fibers extending from said roll as the latter is rotated therepast to momentarily hold said fiber engaged thereby against the direction of rotation of said roll and as said roll continues to be rotated, releasing said fiber in a springing action to project particles of toner held between said fiber into the developer apparatus.

9. A dry toner dispenser assembly as claimed in claim 8 wherein said dispenser control means includes an elongated bar member mounted adjacent to said dispenser roll for engagement at an edge thereof with said resilient fibers, along the length of said roll.

10. A dry toner dispenser assembly as claimed in claim 8 wherein an edge of one of said front and rear walls of said hopper means is positioned predeterminedly with respect to said roll for metering toner particles thereto whereby a predetermined quantity of toner particles is carried between the fibers of said roll outwardly through the bottom opening of said hopper means and wherein said assembly further includes agitator means mounted in said hopper means for rotation therein, said agitator means being coupled to said dispenser roll for rotation in accordance therewith.

11. A dry toner dispenser assembly as claimed in claim 7 further including means for selectively regulating the pivotal movement of said drive member in said first direction, said regulating means including a stop member for limiting the movement of said drive member when the latter is engaged by said wheel means.

* * * * *

UNITED STATES PATENT OFFICE

CERTIFICATE OF CORRECTION

Patent No. 3,946,910 Dated March 30, 1976

Inventor(s) Brian J. Case

It is certified that error appears in the above-identified patent and that said Letters Patent are hereby corrected as shown below:

Column 2, line 18, "in" should read -- is --.

Column 6, line 63, "subsstantially" should read -- substantially --.

Column 7, line 46, "to to" should read -- to --.

Column 8, line 13, "said" should read -- and --.

Signed and Sealed this

Thirteenth Day of July 1976

[SEAL]

*Attest:*

RUTH C. MASON
*Attesting Officer*

C. MARSHALL DANN
*Commissioner of Patents and Trademarks*